United States Patent
Satterthwaite et al.

[15] 3,689,082
[45] Sept. 5, 1972

[54] INFLATABLE SEAL

[72] Inventors: James Glenn Satterthwaite, 5001 Dogwood Trail, Portsmouth, Va. 23703; James B. Macy, Jr., 107 Holly Lane, Morehead City, N.C. 28557

[22] Filed: Feb. 3, 1970

[21] Appl. No.: 8,278

[52] U.S. Cl. ................................................. 277/34
[51] Int. Cl. .......................... F16l 33/16, F16j 15/46
[58] Field of Search ............. 277/34, 34.3, 34.6, 226

[56] References Cited

UNITED STATES PATENTS

| | | |
|---|---|---|
| 2,943,874 | 7/1960 | Valdi et al. ............... 277/34.3 |
| 2,841,422 | 7/1958 | Badger ....................... 277/34 |
| 3,178,779 | 4/1965 | Clark et al. ............... 277/34 X |
| 2,822,192 | 2/1958 | Beatty ....................... 277/34 X |

Primary Examiner—Samuel B. Rothberg
Attorney—McNenny, Farrington, Pearne and Gordon

[57] ABSTRACT

There is provided an inflatable peripheral seal which is characterized by a closed loop gas-impervious body of an elastomeric material formed from an extruded section and joined at its ends and having oppositely disposed inner and outer peripheral sealing surfaces. The loop contains at least one interiorly disposed continuous chamber defined in part by a flexible wall which is movable between a first position and a second position in response to fluid pressure. The wall is stable in the first position when the pressure differential across the wall is below a predetermined value. The joint between the ends of the extruded section is free of tensile stresses both when the seal is inflated and deflated. Further, the joint can be made after the seal is positioned around a shaft so that the seal can be installed without moving the seal over the ends of such shaft.

20 Claims, 8 Drawing Figures

INVENTORS
JAMES GLENN SATTERTHWAITE
& JAMES B. MACY, JR.
BY
McNENNY, FARRINGTON, PEARNE & GORDON
ATTORNEYS

INVENTORS
JAMES GLENN SATTERTHWAITE
& JAMES B. MACY, JR.
BY
McNENNY, FARRINGTON, PEARNE, & GORDON

ATTORNEYS

INFLATABLE SEAL

BACKGROUND OF THE INVENTION

The present invention relates generally to peripheral seals and more particularly to inflatable ring type seals. These inflatable seals are of particular utility in an annulus between tubular bodies subject to various conditions of rotational relative movement, and axial relative movement. Thus, these seals have wide utility for a variety of structures including, for example, shaft seals for marine propeller shafts extending through the wall of a vessel; internal sealing means for pipe; and pipe or shaft couplers of various kinds, e.g., rigid or flexible, stationary or rotatable, etc. It will be understood, however, that the principals of this invention may be employed in other applications.

The invention will be discussed for convenience with more particular reference to marine installations. The propeller shaft as it passes through the hull of a marine vessel may be supported by a water lubricated rubber bearing or the like. An example of such a bearing is described in U.S. Pat. No. 3,407,779. When such bearing is located in the stern tube, a shaft seal is provided inboard of the bearing to prevent water from entering the hull. In addition to providing a seal to prevent the flow of sea water into the hull, this sealing assembly is also conveniently utilized for the force admission of lubricating fluid, e.g., water, to the stern tube or shaft bearing. Vessels commonly encountering poluted waters or harbors or inland waterways sometimes utilize filtered water applied to the bearing from inside the vessel which flows through the shaft bearing in an outboard direction under positive pressure.

These prior structures have often utilized a fibrous packing body compressible by a packing gland into sealing relation with the shaft. To prevent excessive wear and to provide cooling, it is customary to adjust the packing so that it is sufficiently loose to permit a controlled amount of water to flow in an inboard direction into the hull. Water is not a preferred lubricant for fibrous packing members in confronting relation with a relatively moving metal shaft. Therefore, wear tends to occur.

When it became necessary to replace the packing, and in order to avoid removal of the vessel from the water, a temporary, selectively operable sealing means in the form of an inflatable ring or pneumatic seal has been provided in the shaft seal apparatus outboard of the fibrous packing member or members. When inflated, these sealing means distended inwardly and peripherally contacted the shaft with a force sufficient to withstand the hydrostatic pressure of water attempting to flow into the hull along the shaft, thereby permitting replacement of the fibrous packing member or members while the vessel remained in the water. Examples of such seals are disclosed in the U.S. Pat. Nos. 2,648,554; 2,946,608, and 3,121,570.

In the past, difficulty has been encountered with seals of this general type since they have tended to wear and fail. The wearing failure of such seals has tended to occur from two causes. First, when the seal was inflated, the rubber forming the seal contact surface tended to permanently deform after becoming distended thus causing contact to be maintained between portions of the seal contact surface and the shaft even after the seal was deflated. Such contact over a period of time caused the seal to wear thin with ultimate failure. Further, the deflating or exhausting of the pressurizing fluid from the interior of the seal after it has been inflated is often not complete and a small residual pressure remains in the seal. When this occurs, the permanent deformation is augmented and seal wear becomes greatly accelerated.

Generally in the past, the inflatable seal has been operated only when it was necessary to repair or replace the packing. However, in many instances, the inflatable seal is presently operated whenever the vessel is tied up and is not under power for a period of time. For example, in many rivers and harbors, polution control regulations have been established restricting the pumping of bilges and restricting the discharging of other forms of waste. Since the typical stuffing box permits a continuous flow of water at a controlled rate through the gland area, there is a tendency for water to accumulate in the bilges or elsewhere in the vessel which water must be pumped out at intervals. In order to prevent the leakage of water in through the stuffing box when the shaft is not rotating, the practice has therefore been established in many instances to inflate the seal to positively prevent any further flow of water into the vessel along the shaft whenever the shaft is not in operation. Consequently, the shaft's seals are inflated far more often than in the past where they were used only to permit repair or replacement of the packing. Consequently, the likelihood of damage to the seal resulting from permanent deformation or from failure to completely deflate the seal is greatly increase.

SUMMARY OF THE INVENTION

In our copending application, Ser. No. 791,082, filed Jan. 14, 1969, the disclosure of which is incorporated herein by reference thereto, we have discussed an improved inflatable seal having improved nonwear characteristics thereby reducing the necessity for replacement. Insofar as the embodiment of the present invention in marine propeller shaft seals is concerned, the present invention provides a novel and improved one piece seal to provide access to installation of the ring seal around the shaft without removing the shaft and without requiring a split housing.

Also, the improved seal can be pressurized under controlled conditions, in relation to the environmental hydrostatic pressure, wherein the seal contact surface engages a rotating journal surface with sufficient pressure differential to serve effectively as a running seal. Lubrication is adequately provided by the boundary layer of water wetting the journal surface under the seal as a result of capillary action. Under such controlled conditions, the seal can be used at the ends of outboard bearings around a rotating or stationary shaft, to seal a desired lubricant within the system, while sealing the environmental waters out.

In another embodiment of the present invention, instead of providing a seal about the outside diameter of a shaft, a seal is provided on the inside diameter of a pipe, for example. The structures of the present invention are also adapted for use in providing a seal between an outer casing and an outlet pipe, for example, as in an oil or gas well. Similar structural improvements are provided which render devices so used more readily adapted to their intended use and more readily handled in the field.

The present invention is an improvement upon the prior art devices of the types mentioned above. Significant to he achievement of the improved results is the structure of the closed loop gas-impervious tubular body of an elastomeric material which is preferably formed from an extruded section. It is characterized by a joint at the confronting ends of the extruded section which are brought into juxtaposed abutting relation to form the loop. The seal is designed so that such joint is subjected to substantial compressive stresses in the inflated condition as opposed to tensile stresses. Therefore, the tendency for leakage to occur at the joint is eliminated.

In one preferred embodiment of this invention, the extruded seal member is provided with slots at its ends which are adapted to receive and retain a relatively short and relatively rigid member, e.g., a metallic interlocking member. Such interlocking member bridges the outer portion of the joint and prevents any leakage along such portion. The force of engagement along the remaining portions of the joint increase with seal inflation pressure so leakage does not occur. The abutting ends require no adhesive, although an adhesive, particularly of the non-setting and/or pressure sensitive type, may be used if desired. With such a structure, installation or removal of a seal member can be readily accomplished without removal of the shaft, nor is it necessary that the seal housing be split, since the seal may be inserted and removed from the end of a solid one piece housing.

The seal is also designed for close fitting coaction with a recess in a shaft seal housing when embodied in a shaft seal structure for a marine propeller shaft. For ready removability, the housing of the shaft seal structure is provided with a removable retaining flange axially removable from the shaft seal housing to permit access to the inflatable peripheral seal.

When the inflatable peripheral seal of the present invention is adapted for sealing coaction with the internal surface of a tubular member, a structure is used which is similar in many respects to the shaft seal for marine propeller shafts. However, the sealing surface is opposite to that of the shaft seal structure as hereinafter more particularly described.

The illustrated inflatable sealing of the present invention has an internal peripheral cavity having at least one flexible wall removable between a first position and a second position in response to fluid pressure and which are stable in the first position when the pressure differential across the wall is below a predetermined positive value. The exterior surface of the flexible wall is, as indicated above, either an inner or an outer sealing surface, and is substantially free of peripherally directed tensile stress in either position. The sealing surface is adapted for sealing engagement with a confronting rigid surface. In order to provide for pressurizing the device and causing movement of the flexible wall into and out of sealing engagement with a confronting rigid surface, there is provided an internal continuous chamber adapted to receive and contain fluid gas, usually air under pressure.

Access to the internal chamber is provided by a rigid inlet duct or fitting which extends with an interference fit through a wall of the inflatable seal other than the flexible sealing wall. In a preferred embodiment the fitting provides a rigid tubular body which protrudes slightly beyond the associated wall into the internal fluid chamber. The initial seal is provided by the interference fit and the pressure of the fluid increases the sealing pressure as a direct function of fluid pressure so leakage does not occur.

DETAILED DESCRIPTION OF THE DRAWINGS

Figure 1:
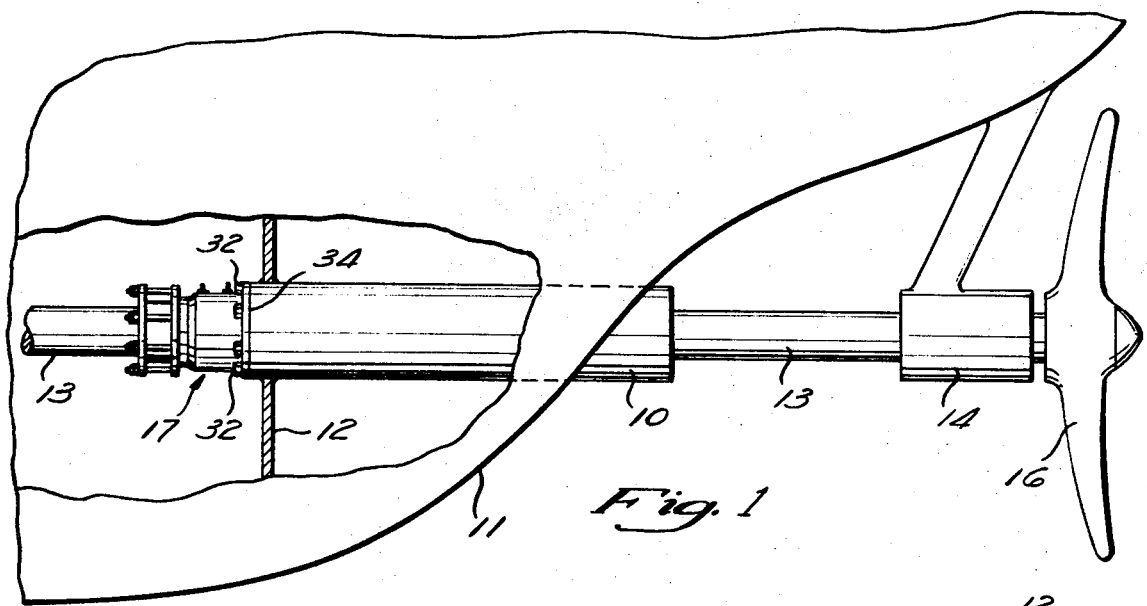
FIG. 1 is a fragmentary partially cut away view of the stern portion of a marine vessel showing a marine propeller shaft extending through the ship's hull and provided with a propeller shaft seal structure embodying the improved inflatable peripheral seal of the present invention.

FIG. 1 schematically illustrates the stern portion of a typical marine propulsion system. A stern tube 10 is supported at its outboard end by the hull structure 11 and its forward end by a bulk head 12. A propulsion shaft 13 extends through the stern tube 10 and an outboard bearing 14 adjacent to a propulsion screw 16. Water lubricated bearings of the type illustrated in our application for U.S. Letters Patent, Ser. No. 653,796, Filed July 17, 1967, may be provided in the stern tube 10 and the outboard bearing 14 to support the shaft 13 for rotation. Mounted on the inner end of the stern tube 10 is a seal assembly 17 which prevents flow of water along the shaft 13 into the hull 11. Mounted in the seal assembly is a packing gland assembly and an inflatable seal in accordance with the present invention.

Figure 2:
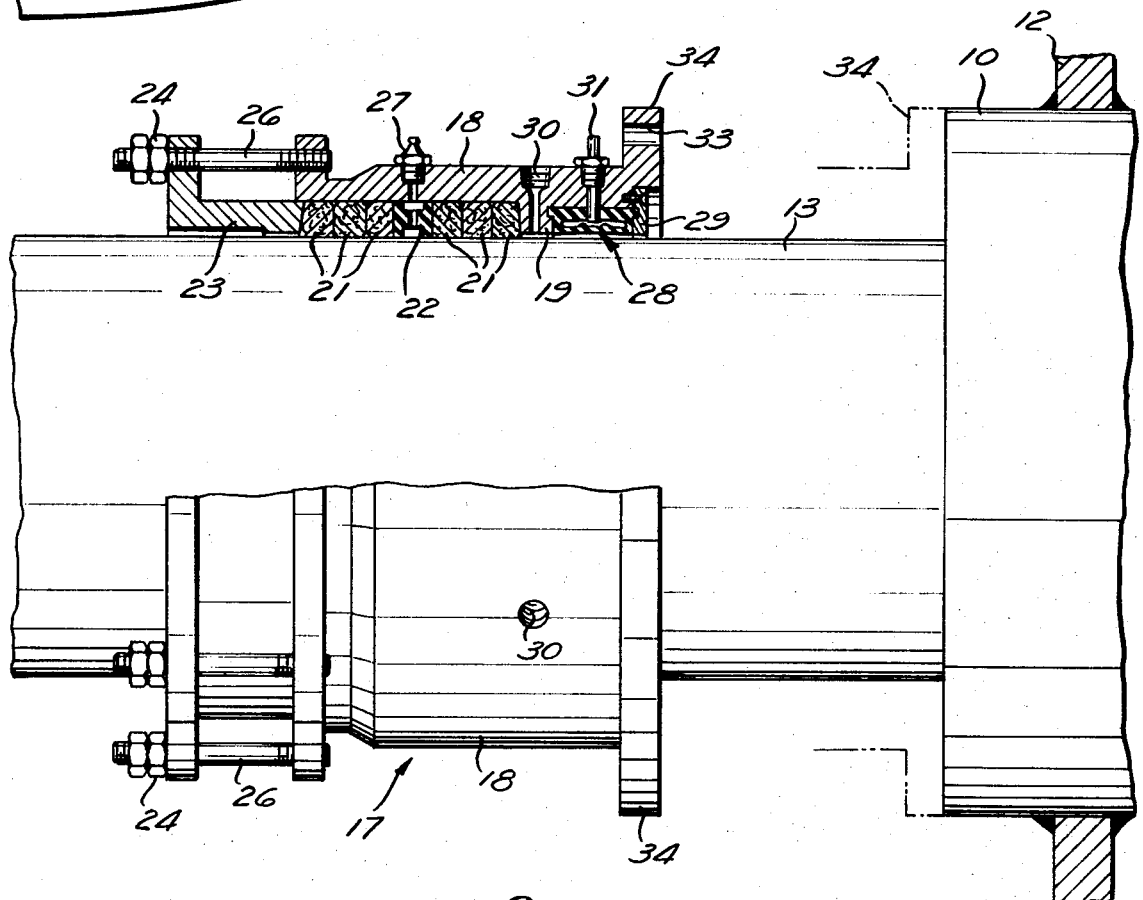
FIG. 2 is an enlarged view partially in section of the packing gland seal housing in accordance with this invention illustrating the structural detail thereof.

Referring to FIG. 2, the seal assembly includes a main housing member 18 provided with an inwardly extending shoulder 19. A packing assembly consisting of a plurality of packing rings 21 and a lantern ring 22 is positioned within the housing member 18 inboard of the shoulder 19 and are adjustably compressed by a gland ring 23. The adjustment of the gland ring is provided by nuts 24 threaded onto bolts 26. A lubricant such as a petroleum grease is supplied through a fitting 27 to the lantern ring 22 which insures the even distribution of the lubricant around the gland. In practice, the gland ring 23 is adjusted so that a controlled relatively small amount of leakage occurs past the packing rings 21. With such adjustment, the water flowing past the packing rings cooperates with the petroleum lubricant to provide lubrication between the shaft 13 and the packing rings and provides sufficient cooling to prevent excessive heat from being developed. As the packing rings wear, the gland ring 23 is tightened to maintain proper operation until the packing is sufficiently worn to require replacement. Reference may be made to our copending application, referred to above, for a more detailed description of the function and operation of the packing gland assembly.

An inflatable seal 28 is mounted in the housing member 18 outboard of the should 19. The seal 28 extends between the shoulder 19 and a removable shoulder or ring 29. The seal 28 when deflated, is spaced from the surface of the shaft 13 and when inflated, is pressed against the shaft 13 to provide a positive seal therewith. Fluid under pressure, usually air, is supplied to the seal through a fitting 31 to inflate the seal. Normally the housing member 18 is positioned against the inboard end of the stern tube 10, as illustrated in FIG. 1 and is retained in position by bolts 32 which extend through bolt holes 33 in a flange 34. The flange 34 is illustrated in phantom in FIG. 2 in the normal operative position.

When it is necessary to remove or replace a seal 28 the bolts 32 are removed and the seal housing assembly 17 is moved along the shaft 13 as illustrated in FIG. 2 to provide access to the ring 29. The method of installation and removal of the ring is discussed in detail below.

When the shaft is operating lubricating water for the water lubricated rubber bearing in the stern tube 10 may be supplied to the bearing through peripherally spaced openings 30 which extend through the shoulder 19. Water supplied through such opening flows along the shaft 13 past the seal 28 to the bearing within the stern tube.

Figure 3:
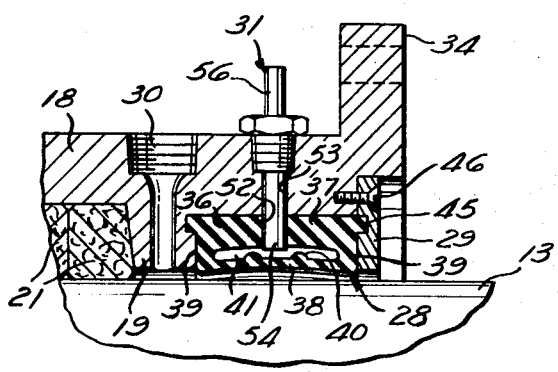
FIG. 3 is an enlarged fragmentary section of the housing and seal illustrating the seal in the deflated condition.
Figure 3A:
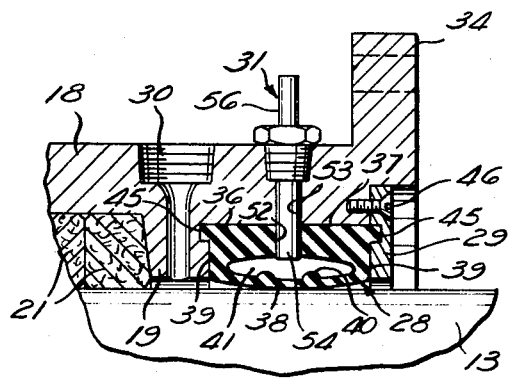
FIG. 3a is an enlarged fragmentary view similar to FIG. 3 illustrating the seal in the inflated and sealing condition.
Figure 4:
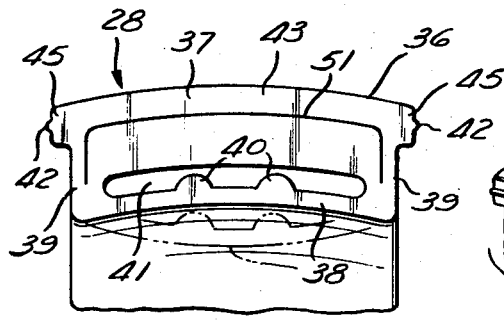
FIG. 4 is an enlarged fragmentary view illustrating the cross section of the seal prior to installation thereof in the housing.
Figure 5:
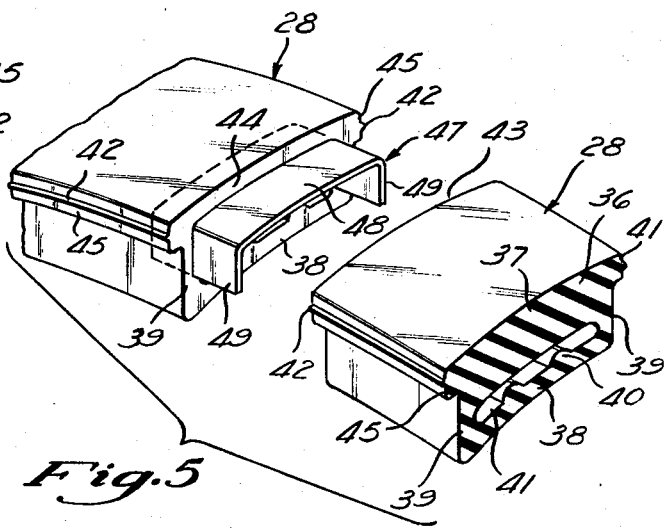
FIG. 5 is a fragmentary perspective view illustrating the bridging clip which extends between the ends of the seal.

Referring to FIGS. 3 through 5, the seal 28 is formed of an elongated body 36 of a gas-impervious elastomeric material, usually rubber. The body includes an outer peripheral wall 37 of relatively thick section, an inner peripheral and flexible wall 38 of thinner section, and radially extending end walls 39. A continuous internal chamber 41 is provided within the seal 28. The body 28 is formed with axially extending flanges 45 which interfit with mating recesses formed in the shoulder 19 and the ring 29 to positively lock the seal 28 in its mounted position as illustrated in FIGS. 3 and 3a. Preferably, the shoulders 45 are provided with small ribs 42 as illustrated in FIGS. 4 and 5 which produce a pint of high localized pressure between the seal and the housing member 18 and the ring 45 to insure that leakage does not occur therebetween.

The body 36 is formed so that the seal assumes a position as illustrated in FIG. 3 whenever the pressure within the chamber 41 exceeds the surrounding pressure by less than a positive predetermined amount. This is accomplished by arranging the structure so that the flexible wall 38 is in substantially its unstressed condition when it is concaved as illustrated in FIG. 3. In such condition, the seal is spaced from the shaft 13 and no wear can occur. When the chamber 41 is pressurized by admitting fluid under pressure, such as air, through the fitting 31, the wall 38 snaps through to the position illustrated in FIG. 3a and engages the surface of the shaft 13 with sufficient pressure to prevent any leakage along the shaft past the seal. Because the central portion of the flexible wall 38 moves radially inward during inflation, the peripheral length of the wall must reduce and the wall is placed in a compressive stress. Therefore, the wall does not move to the inflated position until sufficient pressure exists within the chamber 41 to overcome the compressive stress and cause the wall to move to its sealed and operative position.

The structure of the seal is also arranged so that the wall 38 is bistable. This results from the fact that the lateral width of the wall 38 is constant due, in part, to the confinement provided by the housing so that the initial movement of the wall 38 from its position of FIG. 3 produces lateral compression in the material forming the wall which resists this movement. However, once the wall passes through an unstable position in which the effect of the lateral compression forces in the wall reverse, these stresses tend to cause the wall to snap on through the inflated and sealed position of FIG. 3a. The position of instability is the position in which the wall is substantially straight, since the lateral width of the wall is smallest at this time and increases when the wall moves to either the concave release position or the convex inflated position.

When the chamber 41 is exhausted and the pressure therein decreases this bistable characteristic of the wall tends to retain the wall 38 in the operative position until the force of the fluid under pressure in the chamber 41 decreases to a value sufficiently low to cause the peripherally directed compressive stresses in the wall to overcome the lateral stresses and the pressure induced force. When this occurs, the wall 38 snaps back to its release condition. Preferably, the seal is arranged so that this occurs when the pressure in the chamber 41 is still greater than the surrounding pressure by some positive predetermined value in the order of at least 2 to 5 pounds. Therefore, when an operator releases the pressure in the chamber 41, the wall will snap back to its release position even if the operator inadvertently leaves a material positive pressure within the chamber 41. Consequently, the tendency for the seal to be inadvertently left partially inflated and in contact with the shaft 13, is substantially eliminated. Further, the structural arrangement wherein compressive stresses are created in the wall 38 during inflation of sufficient magnitude to insure a snap action to the release position, materially reduces the tendency for the materials to take a sufficient set during inflation to cause a residual contact to remain between the seal and the shaft.

In the illustrated embodiment, the wall 38 is formed with two peripherally extending ribs 40 to provide an increase in thickness in the center portion of the wall 38. With this structure, the amount of material subjected to compressive stress can be increased thus increasing the magnitude of the compressive stress forces when inflated without materially increasing the lateral stiffness of the wall. The proper selection of the thickness of the wall 38 between the side walls 39 and the ribs 40 provides the desired amount of snap action and the separate selection of the size of the ribs provides the desired amount of force urging the wall to its concave position.

Although the operational advantages discussed above can be obtained with a one piece seal which has to be assembled over the end of a shaft either by sliding it along the shaft or by withdrawing the shaft from the housing while the seal is positioned, the preferred structure of a seal in accordance with this invention can be installed into a solid housing without relative movement of the seal over the end of the shaft. Therefore, such seal can be installed or replaced without removing the shaft 13 from the housing 18 or moving the housing to the end of the shaft. In accordance with this aspect of the invention the seal is formed of an elongated body having ends which are joined after the seal is positioned around the shaft 13. Preferably, the body 36 is formed by extruding an elongated piece of elastomeric material in substantially the shape illustrated in FIG. 4. The body is then wrapped around a mandrel to a circular shape with the two ends substantially abutting. While held in this ring shape the elastomeric material is cured and the body is in the shape of a ring having two free ends of a mating shape. These two ends are the ends 43 and 44 illustrated in FIGS. 4 and 5.

Because the body 36 is formed of a flexible material the ends 43 and 44 can be pulled apart and pulled up over the shaft 13 and reclosed with the ring seal positioned around the shaft. The length of the ring is sized so that it snugly fits into the recess in the housing member 18 and the ends 43 and 44 are in abutting relationship at that time. As mentioned previously, access to permit the removal or insertion of the seal is provided by removing the bolts 32 and sliding the seal housing assembly 17 along the shaft as illustrated in FIG. 2. When this is done the ring 29 is removed by removing the screws 46 to provide access to the seal proper. The ring 29 can be formed as a single continuous ring or can be formed as a group of segments which cooperate when the ring is mounted in place to form a ring extending completely around the shaft. Because the housing 18 and the ring 29 radially and axially confine the seal 28 with the ends 43 and 44 in abutment, pressurization of the chamber 41 does not produce any circumferentially directed tensile stress in the ring so the two end faces 43 and 44 are not pulled apart. Consequently, it is not necessary to provide a permanent bonded type connection between the two ends, although such a connection can be used if desired.

Even when no connection is provided between the ends there is no tendency for the seal to leak across the flexible wall 38 portion of the joint since pressurization of the seal causes the wall 38 to be placed in circumferentially directed compressive stress, and such stress causes the pressure of engagement between the ends of the wall 38 to increase with pressure and maintain a nonleaking joint. If leakage tends to occur, it will occur only across the portion of the joint along the outer wall 37 and the end walls 39. To prevent such leakage we provide a substantially rigid bridging clip or member 47. This member is preferably formed of sheet metal and has a U-shape with the base 48 of the U projecting into the outer wall 37 and the legs 49 of the U extending down along the end walls 39. Preferably, the ends of the body 28 are formed with a slit or cut 51 proportioned to receive the bridging member 47 as illustrated in FIG. 5 with the bridging member 47 extending about half of its length into one end and extendable through the other half of its length into the other end.

Preferably, the bridging member 47 is installed and adhesively secured in one end of the seal at the time of manufacture, so that it will not be lost during shipment. However, such adhesive connection is not necessary for purposes of establishing a seal since once the ends are pushed together with the bridging member extending therebetween, the force of the fluid under pressure in the chamber 41 increases the sealing pressure of engagement between the adjacent parts of the rubber and the bridging member. In practice, it has been found that a seal provided with a bridging member in this manner can be pressurized and maintains the pressure without leakage for extended periods of time even though the two ends 43 and 44 of the body 28 are not adhesively connected and merely abut each other, and even though no positive connection is provided between the flexible wall portions 38 of the end.

The fittings 31 are preferably inserted after the seal 28 is positioned within the housing 18 and the ring 29 is installed. Since it would be very difficult to orient the seal 28 in a predetermined position, the ring 28 is installed with the fittings 31 removed. Removal of the fittings is accomplished merely by unscrewing them from the threaded openings in the housing. While the fittings are removed and when the seal is in place, a hole 52 is cut through the outer wall 37 by inserting a cutter or drill through the opening 53 in he housing member 18. Preferably, the cutter or drill should be substantially the same size as the opening 53 since elastomeric material tends to spring back when cut in this manner.

After the hole 52 is cut through the wall, the fitting 31 is threaded into the body 18 so that its tubular extension 54 extends through the hole 52 with an interference fit. Preferably, the tubular projection 54 is lubricated so that it will slide through the hole 52 during the insertion. Such lubrication can be obtained by merely wetting the tubular extension 54 since water provides a good lubricant with rubber-like elastomeric material. The fitting is then connected through a tubular projection 56 to a valved source of fluid under pressure so that the seal may be inflated and deflated.

It is important to arrange the structure so that the tubular projection 54 extends slightly past the wall 37 as illustrated in FIGS. 3 and 4. This prevents the wall from hanging up on the end of the tubular projection and allows the wall to compress inwardly against the tubular projection as the chamber is pressurized. This maintains a sealing pressure along the interface which is greater than the pressure of the fluid being sealed. It is merely necessary to insert the seal so that the bridging clip 47 and the joint is spaced peripherally from the fitting 31.

Preferably the body 28 is molded so that the outer wall 37 is convex in its unstressed condition as illustrated in FIG. 4 and the mating cavity in the housing is provided with a cylindrical surface. Therefore, the insertion of the seal radially deflects the outer wall 37 inward to insure a tight engagement between the end faces along the outer wall and to insure a tight engagement of the wall adjacent to the tubular extension 54.

Figure 6:
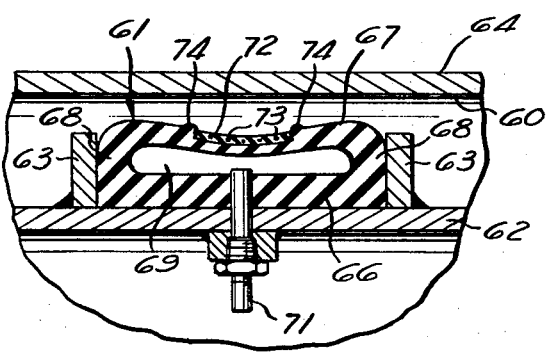
FIG. 6 is a fragmentary section of a second embodiment of a seal in accordance with this invention illustrating such seal in the deflated condition.
Figure 7:
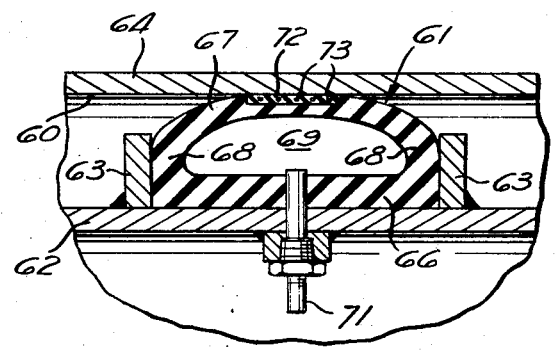
FIG. 7 is a fragmentary section of the seal illustrated in FIG. 6 showing the seal in an inflated and operative position.

FIGS. 6 and 7 illustrate a second embodiment of this invention in which an inflatable seal is provided to seal with an internal cylindrical surface. In this embodiment a ring seal 61 formed of an elastomeric gas-impervious material is mounted on the outer surface of a cylindrical member 62 between axially spaced shoulder elements 63. When deflated as illustrated in FIG. 6, the seal 61 is spaced from the inner surface 60 of an outer cylindrical member 64 and when the seal is inflated the wall expands out into engagement with the cylindrical member as illustrated in FIG. 7.

Here again the seal 61 is preferably formed of extruded material providing an inner wall 66, an outer flexible wall 67 and two side walls 68. The seal provides an interior continuous chamber 69 through which fluid under pressure may be admitted through a fitting 71 similar to the fitting discussed above in connection with the first embodiment.

In the second embodiment the seal is extruded with a shape substantially as illustrated in FIG. 7 so that the materials forming the flexible wall 67 is substantially unstressed when the seal is inflated as illustrated in FIG. 7. The seal is provided with a tension ring 72 formed of elastic material which is stretched around the outer wall 67 and compresses the outer wall inwardly to the deflected position of FIG. 6 when the chamber 69 is not pressurized. This tension member may be formed of an elastomeric material such as rubber having a greater tensile strength than the rubber forming the main body or may include other elastic materials of high tensile strength. In fact, the tension member may be formed of a high tensile strength rubber material provided with circumferentially directed filaments 73 of high tensile strength such as suitable metal filaments or filaments formed of other materials.

When the chamber 69 is not pressurized, the wall 67 is deformed inwardly and the seal is spaced from the inner surface 60 of the cylindrical member 64. However when the chamber 69 is pressurized, sufficient radial forces are developed to stretch the tension member 72 and cause the seal to extend to the operated position of FIG. 7 in which the seal engages the cylindrical member 64 with sealing engagement. If the surface of the tensile member is of a type which does not provide good sealing engagement with the tubular member 64, the seal 61 can be formed with radially extending ribs 74 which tightly engage the member 64 to provide a proper seal. In FIG. 7 such ribs have been elastically deformed by the engagement.

Because the wall 67 is molded initially to have a shape substantially the same as the shape it assumes in the inflated and sealed condition, it is not subjected to any significant peripherally directed tensile stresses. Therefore, the joint between the ends of the seal are not subjected to any destructive forces which would tend to cause joint failure. In most instances, however, the seal of this second embodiment is formed with a permanent bonded type joint at the ends of the body to insure that the fluid in the chamber 69 cannot leak out through the flexible wall 67 at the area of the joint. Such joint, however, since it is not subjected to damaging tensile stresses, is not damaged in the use of the device. The material forming the tension member should be a type which does not take a permanent set when subjected to tensile stresses so that the seal will return to its deflated and released condition when the pressure in the chamber 69 is relieved.

Although preferred embodiments of this invention are illustrated, it is to be understood that various modifications and rearrangements of parts may be resorted to without departing from the scope of the invention disclosed.

What is claimed is:

1. An inflatable annular seal comprising a closed loop having oppositely disposed peripheral sealing surfaces, said loop including a body of gas-impervious elastomeric material formed with an internal chamber, said body providing at least one flexible wall means movable between first and second positions in response to changes in fluid pressure within said chamber for causing at least one of said sealing surfaces to move between operative and inoperative positions, said wall means remaining substantially in said first position with said one sealing surface substantially spaced from its operative position when the pressure in said chamber exceeds the pressure on the exterior of said seal by less than a predetermined positive differential pressure and moving to said second position causing said one sealing surface to move to its operative position only when such differential pressure exceeds said predetermined differential pressure, said internal chamber being continuous, said body being formed with an elongated section joined at its ends, and said wall means being free of peripherally directed tensile stresses when said wall is in either of said positions, said wall means being concave in one of said positions and being convex in the other of said positions.

2. An inflatable annular seal as set forth in claim 1 wherein said wall means has longitudinally extending sides, and means are provided to maintain a substantially constant spacing between said sides.

3. An inflatable seal comprising a closed loop having oppositely disposed peripheral sealing surfaces, said loop including a body of gas-impervious elastomeric material formed with an internal chamber, said body providing at least one flexible wall means movable between first and second positions in response to changes in fluid pressure within said chamber for causing at least one of said sealing surfaces to move between operative and inoperative positions, said wall means remaining substantially in said first position with said one sealing surface substantially spaced from its operative position when the pressure in said chamber exceeds the pressure on the exterior of said seal by less than a predetermined positive differential pressure and moving to said second position causing said one sealing surface to move to its operative position only when such differential pressure exceeds said predetermined differential pressure, said wall means being provided with at least one peripherally extending integrally formed rib within said internal chamber which operates to resist movement of said wall means from said first position to said second position.

4. An inflatable annular seal as set forth in claim 3 wherein said internal chamber is continuous, said wall means is the inner wall of said loop and the material forming said wall means and rib are subjected to increased compressive stress as said wall means moves from said first position to said second position.

5. An inflatable annular seal as set forth in claim 4 wherein said material of said wall means is substantially free of stresses when said wall is in said first position.

6. An inflatable annular seal comprising a closed loop having oppositely disposed peripheral sealing surfaces, said loop including a body of gas-impervious elastomeric material formed with a continuous internal chamber, said body providing at least one flexible wall movable between first and second positions in response to changes in fluid pressure within said chamber for causing at least one of said sealing surfaces to move between operative and inoperative positions, said wall remaining substantially in said first position when the pressure in said chamber exceeds the pressure on the exterior of said seal by less than a predetermined positive differential pressure and moving to said second position only when such differential pressure exceeds said predetermined differential pressure, said wall being provided with at least one peripherally extending integrally formed rib which operates to resist movement of said wall from said first position to said second position, said wall being the inner wall of said loop and the material forming said wall and rib are subject to increased compressive stress as said wall moves from said first position to said second position, said material of said wall being substantially free of stresses when said wall is in said first position, said body includes at least one elongated member of substantially uniform cross section with at least one of its ends joined to an adjacent similar end, and a bridging element extends between said ends and provides a seal joint therebetween.

7. An inflatable annular seal as set forth in claim 6 wherein said bridging element is a substantially rigid element embedded into the material of each of said ends.

8. An inflatable annular seal as set forth in claim 7 wherein said bridging element is U-shaped and connects said ends excepting along said flexible wall.

9. An inflatable annular seal as set forth in claim 8 wherein said bridging element provides the only positive connection between said ends.

10. An inflatable annular seal as set forth in claim 9 wherein said body is a one piece extruded member joined at its ends.

11. An inflatable seal comprising a closed loop having oppositely disposed peripheral sealing surfaces, said loop including a body of gas-impervious elastomeric material formed with an internal chamber, said body providing at least one flexible wall means movable between first and second positions in response to changes in fluid pressure within said chamber for causing at least one of said sealing surfaces to move between operative and inoperative positions, said wall means remaining substantially in said first position with said one sealing surface substantially spaced from its operative position when the pressure in said chamber exceeds the pressure on the exterior of said seal by less than a predetermined positive differential pressure and moving to said second position causing said one sealing surface to move to its operative position only when such differential pressure exceeds said predetermined differential pressure, said seal including a member resiliently urging said wall toward said first position and placing the material of said wall in compression when said wall is in said first position.

12. An inflatable annular seal as set forth in claim 11 wherein said member is in tension and is formed of elastic material extending along the outer peripheral surface of said loop, and said wall is adjacent to said member.

13. An inflatable annular seal as set forth in claim 12 wherein said body is substantially free of tensile stresses in both of said first and second positions.

14. A shaft seal comprising in combination a housing assembly providing a pair of opposed axially spaced radially extending shoulders cooperating with an axially extending wall to define an annular groove, a shaft extending past said groove, an inflatable closed loop seal in said groove around said shaft, said seal including a body of gas-impervious elastomeric material formed with an internal chamber, said body providing at least one flexible wall means movable between a first position spaced from said shaft and a second position in sealing engagement with said shaft, said wall means remaining substantially in said first position when the pressure in said chamber exceeds the pressure on the exterior of said seal by less than a predetermined positive differential pressure and moving to said second position only when said differential pressure exceeds said predetermined differential pressure, said wall means moving said second position to said first position when the pressure in said chamber exceeds the pressure exterior of said seal by a predetermined positive value, said internal chamber being continuous, said loop being formed of an elongated body of uniform cross section provided with a joint at its ends, said ends being joined after said seal is positioned around said shaft, said body being substantially free of tensile stresses when said wall means is in either of said positions, one of said shoulders being removable to permit installation and removal of said seal without removing said shaft, said wall means being concave when in said first position and being convex when in said second position.

15. A shaft seal as set forth in claim 14 wherein said shaft is a propeller shaft of a marine vessel, and said seal prevents flow of water along said shaft when said wall means is in said second position.

16. A shaft seal as set forth in claim 15 wherein said shaft extends into said vessel through a stern tube, said housing assembly includes a packing gland inboard of said seal, and said housing is releasably connected in sealing engagement with said stern tube.

17. A shaft seal as set forth in claim 16 wherein said housing is movable along said shaft away from said stern tube to provide access to said one of said shoulders.

18. A shaft seal as set forth in claim 14 wherein said housing assembly provides a fitting having a tubular extension extending through a wall of said seal other than said flexible wall means into said chamber.

19. A shaft seal as set forth in claim 18 wherein said fitting is removable and said seal resiliently engages the exterior of said tubular projection at a location spaced from its inner end.

20. An inflatable annular seal comprising a closed loop having oppositely disposed peripheral sealing surfaces, said loop including a body of gas-impervious elastomeric material formed with a continuous internal chamber, said body providing at least one flexible wall movable between first and second positions in response to changes in fluid pressure within said chamber for causing at least one of said sealing surfaces to move between operative and inoperative positions, said wall remaining substantially in said first position when the pressure in said chamber exceeds the pressure on the exterior of said seal by less than a predetermined positive differential pressure and moving to said second position only when such differential pressure exceeds said predetermined differential pressure, said body being formed of at least one elongated member of substantially uniform cross section with at least one of its ends joined to an adjacent similar end, and a bridging element extends between said ends and provides a seal joint therebetween.

* * * * *